United States Patent [19]
Yamashita et al.

[11] Patent Number: 5,830,258
[45] Date of Patent: Nov. 3, 1998

[54] METHOD OF RECOVERING RESOURCES IN RESIN-MOLDED ELECTRICAL ROTATING DEVICE

[75] Inventors: Fumitoshi Yamashita, Ikoma; Seiji Kurozumi, Katano; Junko Kaneko, Moriguchi; Akihiko Watanabe, Takefu; Hiroshi Ohnishi, Hirakata; Takahiko Terada, Nara; Yoshikazu Yamagata, Katano, all of Japan

[73] Assignee: Matsushita Electric Industrial Co., Ltd., Osaka, Japan

[21] Appl. No.: 661,896

[22] Filed: Jun. 12, 1996

[30] Foreign Application Priority Data

Jun. 13, 1995 [JP] Japan .................................. 7-145997

[51] Int. Cl.⁶ ........................................................ C22B 7/00
[52] U.S. Cl. .............................. 75/403; 75/711; 29/403.3; 29/426.4
[58] Field of Search .................... 75/403, 711; 29/403.3, 29/426.4

[56] References Cited

U.S. PATENT DOCUMENTS 5,203,067  4/1993  DeFazio ................................ 29/426.4

FOREIGN PATENT DOCUMENTS 0 571 155 A1  11/1993  European Pat. Off. .
1 351 448     5/1974   United Kingdom .

OTHER PUBLICATIONS

Patent Abstracts of Japan, vol. 96, No. 9, Sep. 30, 1996 & JP 08113619 A (Matsushita Electric Industrial Co., Ltd.) May 7, 1996.
Patent Abstracts of Japan, vol. 96, No. 8, Aug. 30, 1996 & JP 08104797 A (Matsushita Electric Industrial Co., Ltd.) Apr. 23, 1996.
Patent Abstracts of Japan, vol. 96, No. 9, Sep. 30, 1996 & JP 08134340 A (Matsushita Electric Industrial Co., ltd.) May 28, 1996.
Patent Abstracts of Japan, vol. 012, No. 221 (E–625), Jun. 23, 1988 & JP 63015654 A (Fuji Electric Co., Ltd.) Jan. 22, 1988.

*Primary Examiner*—Melvyn Andrews
*Attorney, Agent, or Firm*—Wenderoth, Lind & Ponack, L.L.P.

[57] ABSTRACT

A method of recovering resources in a resin-molded electrical rotating device (1,2) in which electromagnetic members (1a,1b,2a) are molded with resin molding (1c,2c) with fine voids so as to be integrally made into a solid body, and a resin for molding of the rotating device (1,2). The method has the steps of disintegrating the resin molding (1c,2c) by chemically decomposing and/or eluting so as to remove the resin molding (1c,2c) from the electromagnetic members (1a,1b,2a) and separating and recovering at least metal components in the electromagnetic members (1a,1b,2a) as the resources.

6 Claims, 5 Drawing Sheets

METHOD OF RECOVERING RESOURCES IN RESIN-MOLDED ELECTRICAL ROTATING DEVICE

FIELD OF THE INVENTION

The present invention relates to a method of recovering resources from a resin-molded electrical rotating device and to a resin for molding of the device. More particularly the invention relates to a resources circulation recycle system in which at least metal components in electromagnetic members are effectively separated and recovered as valuable resources from the resin-molded electrical rotating device.

DESCRIPTION OF THE PRIOR ART

In recent years, 10 W to about 200 W resin-molded rotating devices have been extensively used in driving sources of, for example, automobile radiator cooling fans, air-conditioner blower fans, and agitating impellers of washing machines for downsizing, weight reduction, noise reduction, and improved reliability of electric equipment.

Figure 1A:
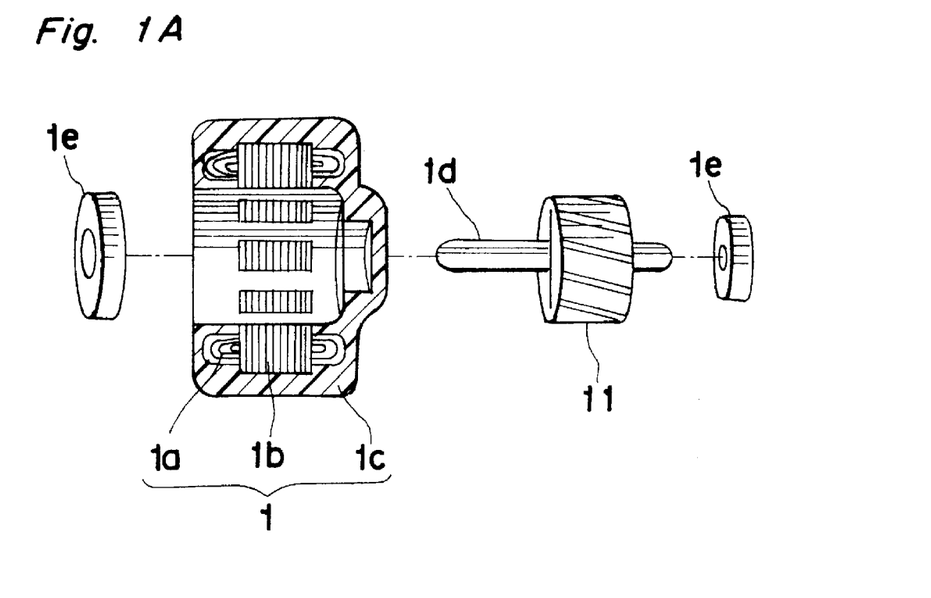
FIG. 1A is a perspective view showing the configuration of resin-molded stator and the rotating device in one embodiment according to this invention.
Figure 1B:
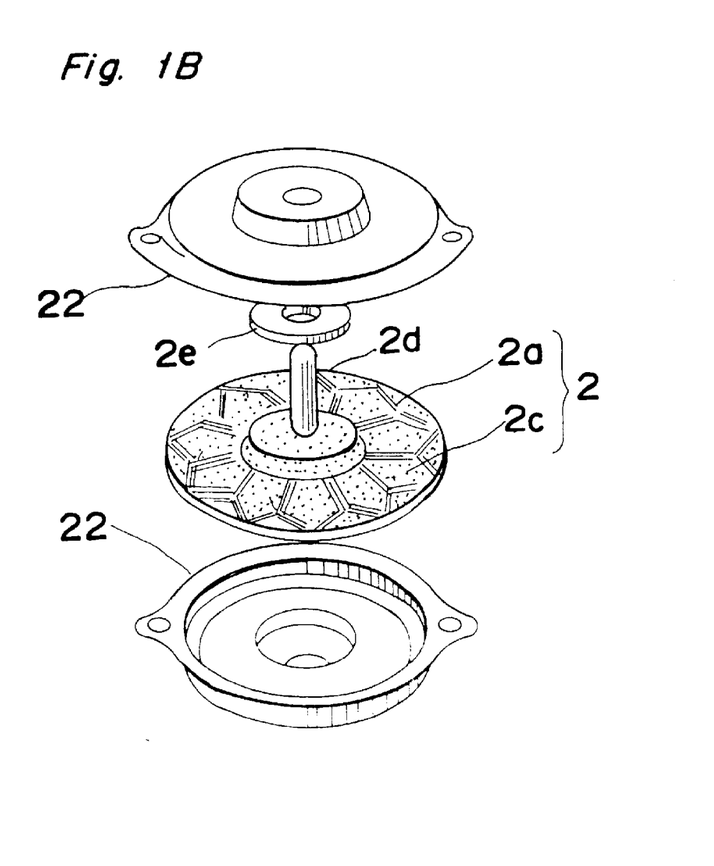
FIG. 1B is a perspective view showing the configuration of resin-molded armature and the rotating device in the same embodiment.

FIG. 1A and FIG. 1B are perspective views to show the construction of the resin-molded rotating device subject to the present invention.

In FIG. 1A, the resin-molded portion is used for the stationary side (stator). FIG. 1B is a perspective view to show the appearance of the resin-molded portion used for the rotating side (rotor). Numerals 1a and 2a are, in general, the insulated cable with copper used as electric conductor or electromagnetic wiring in which self-welding electric wire is wound and 1b of FIG. 1A is laminated flat rolled magnetic steel sheets composing the stator-side electric circuit together with the electromagnetic wiring 1a. Electromagnetic wiring 1a and flat rolled magnetic steel sheet 1b or electromagnetic wiring 2a are molded with resin molding material 1c or 2c and formed into a stator 1 or armature 2, which are regarded as an integral solid body. The stator 1 is assembled with the rotator 11 and the armature with the magnetic field 22 via rotary shafts 1d, 2d, and bearings 1e, 2e to form a so-called resin-molded electrical rotating device. The resin-molded electrical rotating device is used for 10–200 W, or so, driving sources of automobile electric instrumentation, air-conditioners or household electric appliances. The resin-molded electrical rotating device must maintain and secure, for example, high-temperature strength, dimensional stability, thermal impact resistance, electric insulation, and other reliability under these actual service environments. This needs the finishing that allows the resin-molding material and molded members to be regarded as one integral rigid body. Therefore, unsaturated polyester resin molding material containing generally 70% or more organic fillers and various additives which are suitably added as required are migrated or injection-molded to resin-mold the stator or armature and to form the skeletal structure of the rotating device.

The reasons why unsaturated polyester resins are adopted for the resin-molded electrical rotating devices are because of a rapid curing speed due to its typical radical copolymerization and reliability is successfully secured in the temperature range of actual service since its properties can be adjusted to low-shrinkage to non-shrinkage resin compounds.

Now, unsaturated polyester resin is adjusted to various materials including non-FRP application to FRP, as well as PMC (Pre Mix Compound), low-shrinkage BMC (Bulk Molding Compound), and SMC (Sheet Molding Compound), and for the stator side of resin-molded electrical rotating devices, BMC is used, while PMC is applied for the armature side.

By the way, unsaturated polyester resin means the substance in which linear polyester having an unsaturated group obtained by esterifying saturated dicarboxylic acid, its anhydride or its dialkyl ester and unsaturated carboxylic acid, its anhydride and glycol is dissolved in vinyl-based or allyl-based copolymerized monomer. Polymerization curability, fluidity, working life, etc. are adjusted in accord with applications of a wide variety of resin-molded electrical rotating devices, whereas various additives such as reinforcing agents, fillers, pigments, and mold releasing agents are used for maintaining and securing the reliability.

Previously, various designs and ideas have been made on the process for manufacturing resin-molded electrical rotating devices including resin-molding method, conditions, and procedures as well as the process for adjusting unsaturated polyester resin compounds and additives for adjustment in order to maintain and secure reliability, including high-temperature strength, dimensional stability, thermal impact resistance, and electric insulation.

With the popularization of resin-molded electrical rotating devices, with aims to achieve downsizing, weight reduction, noise reduction, and improved reliability, reasonable disassembling method of resin-molded electrical rotating devices which can be regarded as one rigid body integrating resin and molded members, unfortunately designs or ideas have scarcely been made on the disposition of discarded resin-molded electrical rotating devices.

In general, for disposing discarded resin-molded electrical rotating devices, methods such as mechanical crushing or incineration have been considered. But these methods lack a balance with economy from the viewpoint of mechanical or thermal energy consumption, and a method for burying them in ground as they are has been adopted.

SUMMARY OF THE INVENTION

It is an object of this invention to provide a resource recovering process for effectively separating and recovering metal components of electromagnetic members as valuable resources, while maintaining and securing various characteristics of resin-molded electrical rotating devices such as downsizing, weight reduction, noise reduction, and reliability.

This invention disintegrates resin molding, separates and recovers at least the metal component from electromagnetic members of disintegrated residues by chemically decomposing the resin of rotating devices in which at least part of the electromagnetic member is integrally rigidified by resin molding which assumes fine holes. In addition, ester-bonding of the said resin of the rotating devices integrally rigidified with unsaturated polyester resin is alkali-decomposed and at least metal components of the electromagnetic members are separated and recovered.

The resin molding with void structure, according to this invention, does not have the holes unevenly distributed but must secure uniform void distribution, to the inside of the resin molding and must be adjusted to have partly continuous holes for promoting penetration of the decomposing solution.

For a specific means for forming holes, there is a method for adding thermoplastic resins such as polystyrene, polyvinyl acetate, and polymethyl methacrylate.

For example, when polystyrene is dissolved in unsaturated polyester resin for polymerization curing, polystyrene separates and condenses to form holes during polymerization. In this case, between unsaturated polyester resin and void, a mixed phase of the said cured resin and thermoplastic resin exists.

Figure 2A:
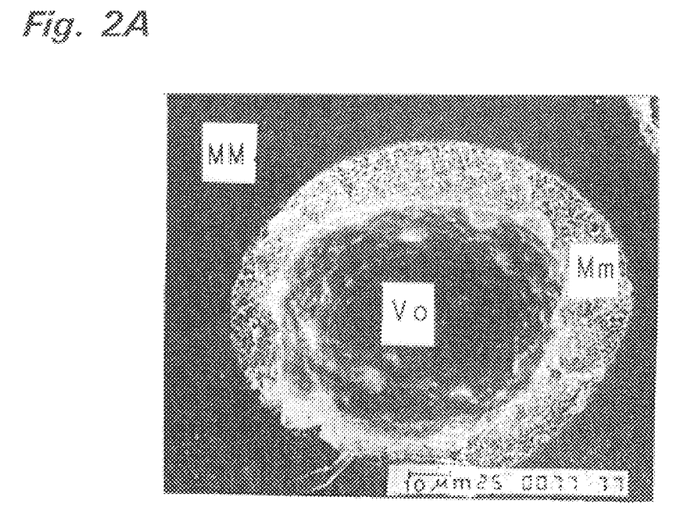
FIGS. 2A and 2B are cross-sectional views of showing voids in resin in plastic molds in the embodiment.
Figure 2B:
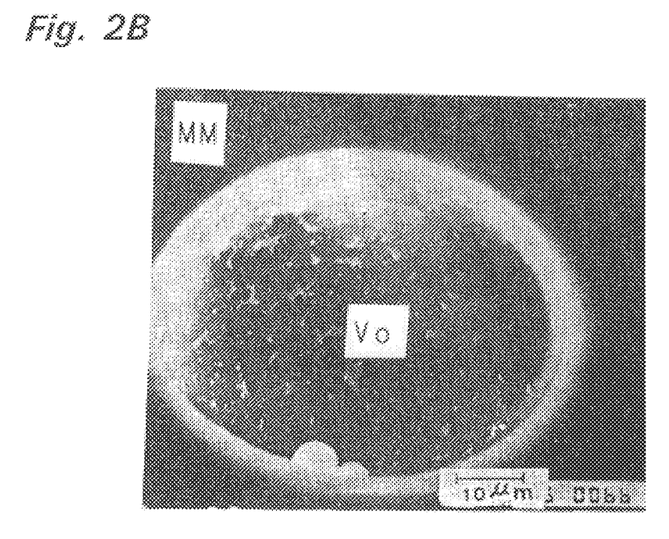

FIG. 2A shows the void generated in resin by allowing polystyrene to separate and condense. Vo in FIG. 2A denotes the void, Mm the mixed phase of cured material and thermoplastic resin, and MM the cured resin. Void Vo has a wide distribution from scores of $\mu m$ to hundreds of $\mu m$. When this is washed with benzene, polystyrene of the mixed phase elutes and is removed as shown in FIG. 2B and cured resin MM and a void Vo remain. Because the thermoplastic resin, with poor compatibility with unsaturated polyester resin, rapidly separates and condenses during polymerization curing of the resin, void Vo is markedly unevenly distributed on the plastic molding surface. Consequently, it is essential to use thermoplastic resin such as aliphatic saturated polyester with excellent compatibility with unsaturated polyester resin to form voids uniformly distributed to the inside of the plastic molding.

In order to promote decomposition of resin with the alkali decomposing solution penetrating in the void, the mixed phase of resin and thermoplastic resin must not interfere the decomposition. Consequently, the thermoplastic resin itself must be soluble to alkali-decomposable and/or alkali decomposing solution. For this kind of thermoplastic resin, for example, aliphatic saturated polyester resin can be mentioned.

In addition, for a specific means for forming voids, there is a method to discharge pyrolytic gas at temperatures near the polymerization initiation temperature of unsaturated polyester resin or slightly lower than that and to disperse organic compounds likely to form voids in advance. In this event, let the viscosity of unsaturated polyester resin $\eta_{20}° C.$ be 70000 poises or over, it is possible to take pyrolytic gas into the resin to effectively form voids.

In addition, for other specific void forming means, there is a means for swelling thermoplastic resin capsules containing aliphatic or cyclic aliphatic hydrocarbons dispersed in unsaturated polyester resin compounds in advance in the vicinity of or slightly lower than the resin polymerization temperature. In this event, even if the viscosity of unsaturated polyester resin $\eta_2° C.$ is 70000 poises or lower, the cell interferes diffusion of gas. Consequently, voids can be formed in the resin.

The void forming means and void forming rate as described above are adjusted in the range for maintaining and securing the design philosophy of resin-molded electrical rotating devices or the reliability of the said equipment actually in service. The void forming means may be selected properly in one or more combinations.

BRIEF DESCRIPTION OF THE DRAWINGS

These and other objects, features and advantages of the present invention will become clear from the following description taken in conjunction with the preferred embodiments with reference to the accompanying drawings, and in which.

DETAILED DESCRIPTION OF THE PREFERRED EMBODIMENT

This invention will be described in further detail with reference to the accompanying drawings.

Figure 3:
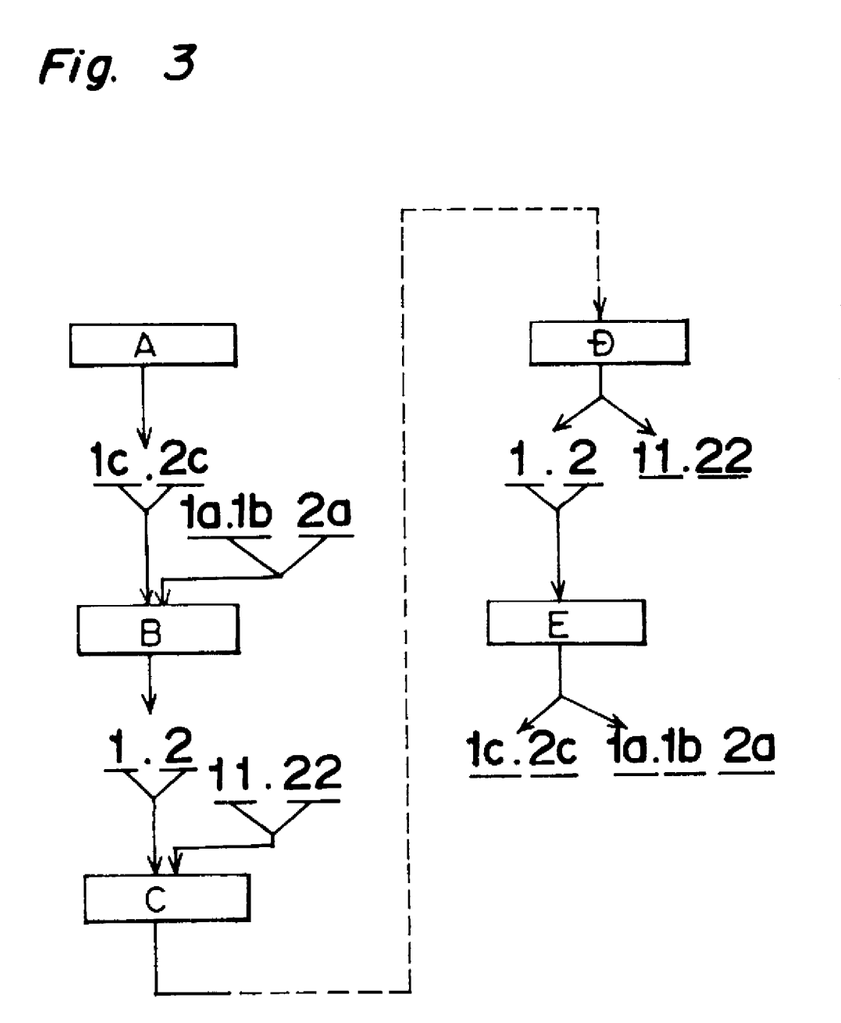
FIG. 3 is a recycle block diagram of resin-molded electrical rotating device in the embodiment.

FIG. 3 shows a method for recovering resources of resin-molded electrical rotating devices according to this invention in a block diagram.

Process A manufactures resin-molding materials 1c, 2c by mixing the voids forming raw material as essential component together with various additives. Process B manufactures a stator 1 or armature 2 which is regarded as a rigid body by molding electromagnetic winding 1a and electromagnetic steel sheet 1b or electromagnetic winding 2a with resin-molded materials 1c, 2c. Process C shows the manufacture of resin-molded electrical rotating devices in which resin mold stator 1 and stator 11, or resin mold armature 2 and magnetic field 22 are assembled via rotary shafts 1d, 2d and bearings 1e, 2e.

The resin-molded electrical rotating devices manufactured in this way as shown in FIG. 1A and FIG. 1B are recovered as discarded resin-molded electrical rotating devices after applied to the equipment in service.

The discarded resin-molded electrical rotating device is disassembled into a resin-molded stator 1 and rotor 11 in Process C, or resin-molded armature 2 and magnetic field 22. Then, in Process E, based on the chemical decomposition and elimination of elution, the plastic molding of the stator 1 or armature 2 is disintegrated and from the disintegration residues of the stator 1, electromagnetic wiring 1a and electromagnetic steel sheet 1b are recovered or from disintegration residue of the armature, electromagnetic wiring 2a is recovered. At least the metal component of the electromagnetic member is open-recycled as valuable resources. It is recommended that the decomposing solution on the other side is reused, inorganic fillers of the disintegrated component is closed-recycled, biodegradable components are buried in the ground and converted to carbohydrate by microbial degradation.

Essential factors of resources recovery method of resin-molded electrical rotating devices as described above according to this invention lie in impartment of voids to resin molding. The void improves penetration of decomposing solution, enabling easy separation and recovery of metal components of electromagnetic members at low energy from discarded resin-molded electrical rotating devices regarded as integral rigid body.

For resin-molded electrical rotating devices, conventionally, it has been common practice to use unsaturated polyester resin compositions. Reasons for adopting unsaturated polyester resin compositions for resin-molded electrical rotating devices are quick curing capabilities for typical radical polymerization, and in addition, it is possible to adjust to low-shrinkage to non-shrinkage resin compositions The unsaturated polyester resin referred to here is the copolymerizable monomer solution of unsaturated polyester alkyd.

Unsaturated polyester alkyd is manufactured by saturated dicalboxylic acid, its anhydride or dialkylester and unsaturated dicarboxylic acid or its anhydride, and glycol as materials and through esterifying reactions. Examples of saturated dicarboxylic acid, its anhydride, examples of the ester dialkyl include phthalic anhydride, iso-phthalic acid, terephthalic acid, dimethyl terephthalate, naphthalendicarboxylic acid, adipic acid, and examples of unsaturated dicarboxylic acid or its anhydride include fumaric acid, maleic anhydride, and itaconic acid. On the other hand, examples of glycol include ethylene glycol, 1–3 butylene glycol, 1–4 butanediol, diethlene glycol, 1–3 butylene glycol, 1–4 butanediol, diethylene glycol, bisphenol A hydride, alkylene oxide adduct of bisphenol A.

There are a vinyl system or allyl system for the copolymerizable monomer, which composes the other principal component, examples of which include styrene, vinyl toluene, divinyl benzene, monochloroethylene, t-butyl styrene, methylacrylate, diallyl phthalate, and triallylcyanate.

The unsaturated polyester resin, in general, contains polymerization inhibitor, and if desired, contains as low shrinkage agent saturated polystyrene, polyethylene, polymethyl methacrylate, and its polymer, as well as saturated polyester such as polyvinyl acetate and polycaprolactam.

The said unsaturated polyester resin includes organic peroxides as radical polymerization initiator, examples of which include benzoylperoxide, methyl ethyl ketone peroxide, t-butyl perbenzoate, dicumyl peroxide, and for polymerization promoter, metal salts such as cobalt naphthanate, cobalt octoate, and amines such as triethanol amine, or diethyl aniline are optionally used.

In addition, thermoplastic resin, such as polyethylene, polyvinyl butyral, alcohol soluble polyamide, etc., inorganic filler, such as calcium carbonate, alumina hydrate, and silica, fiber reinforcer, such as glass and vinyl, inner mold separating agent, such as zinc stearate and calcium stearate, coloring agents, such as titanium oxide and carbon black, and other various kinds of additives are properly added as required.

The various additives may be mixed in a batch with unsaturated polyester resin by a kneader. If the viscosity of unsaturated polyester resin $\eta_{20}°$ C. is 70000 poises or over, it is possible to hot-cut the strand in which those mixed powders are mixed with an extruder and produced in a pellet form.

Dissolving the thermoplastic resin into the said unsaturated polyester resin and polymerization curing cause thermoplastic resin to separate and condense during polymerization and form voids. In this event, between unsaturated polyester resin and voids, there exists a mixed phase of the said curing resin and thermoplastic resin. In order to promote decomposition of the resin with the alkali decomposing solution penetrating in voids, decomposition of the mixed phase with thermoplastic resin must not be interfered. Consequently, it is desirable that thermoplastic resin itself is alkali-decomposable and/or soluble to alkali decomposing solution. In addition, in order to allow voids to uniformly form even inside the resin molding, thermoplastic resin must provide excellent compatibility particularly with unsaturated polyester resin. For the thermoplastic resin that satisfies the above conditions, for example, aliphatic saturated polyester resin can be mentioned.

As a means for forming at least partly continuous voids and for improving the decomposability further, for example, capsules of dinitrosopentamethylenetetramine, azodicarbonamide, toluenesulfonyl azide, azoisobutyronitrile, and other compounds that generate gas at the time of heating, or acrylonitrile-vinylidene chloride copolymer containing aliphatic or cyclic aliphatic hydrocarbons which do not dissolve the cell substance such as butane, isobutane, propane, pentane, hexane, heptane, petroleum ether, dichloropentane, dichloropentadiene, or copolymer of methylmethacrylate are added.

Polymerization and curing of the said unsaturated polyester resin composites are generally accompanied by heat generation. Resin has its viscosity increased while generating heat and at last achieves curing. Even when polymerization initiates at comparatively low temperatures, once polymerization begins, temperature rises to a comparatively high level. However, at that time, the viscosity markedly increases and voids are not successfully formed by generated gas or cell expansion. Consequently, the temperature must be such that enables the generation of pyrolytic gas while the viscosity is still optimum at the beginning of polymerization or the cell containing it begins expansion. Now, the optimum viscosity at the beginning of polymerization is the viscosity necessary to take in the pyrolytic gas into resin and gas can be taken in when $\eta_{20}°$ C. is set to 70000 poises or higher. If it is 70000 poises or lower, it is difficult to take in the gas with resin and it is desirable to utilize cell expansion.

If the die temperature when electromagnetic member is resin-molded is lower than or close to the gas generation initiation temperature or cell expansion initiation temperature, gas generation or cell expansion takes place due to polymerization heat caused by the time delay of heat conduction from the dies. In this event, because viscosity increases excessively due to polymerization and it becomes difficult to form voids. To enable gas generation or cell expansion uniformly throughout the whole resin-molding, it is necessary to keep the die temperature higher than the temperature when gas begins to be generated or cell begins expansion.

On the other hand, if gas generation or cell expansion is allowed before polymerization begins, the generated voids may sometimes disappear if time passes under such condition. It is, therefore, desirable that polymerization should be allowed to quickly take place and the viscosity is allowed to increase to achieve curing when electromagnetic members are plastic-molded. If only the viscosity rises to a certain level, voids remain without disappearing. Consequently, polymerization curing of unsaturated polyester resin should be adjusted to occur at temperatures slightly lower than or equivalent to the gas generation initiation temperature or cell expansion initiation temperature.

The resin molding comprising the said unsaturated polyester resin and various additives properly added as required is immersed in the alkali composing solution comprising the hydrophilic solvent to be used together with the aqueous solution containing at least bases to alkali-decompose the ester bonded portion. It is also desirable to disperse organic additives, for example, alcohol soluble polyamide or polyvinyl butyral, which are easy to alkali-decompose and is ester-bonded and/or is soluble to hydrophilic solvents to the extend that would not impair the reliability of resin-molded electrical rotating devices.

Or, there is no objection to use an ordinary means such as heating and agitation of the decomposing solution or mechanical impact for promoting removal of plastic molding by decomposition or disintegration.

It is desirable for the alkali decomposition product or elution composition to contain one or more types of polymers with biodegradability. The polymer with biodegradability referred to herein is the polymer which is decomposed by microbial contact when disposed of in the nature and is designated to Class 3 or Class 4 according to ASTM G21-70 (1985 Reapproved).

Specifically, examples include microorganism-produced synthetic polyesters such as polyesters with 3-hydroxybutylate used as a unit, microorganism-produced synthetic copolymerized polyesters such as copolymerized polyester of 3-hydroxybutylate and 4-hydroxybutylate, poly saccharides, such as bacteria cellulose, dextran, pullulan, curdlan, xanthan gum, gelan gum, etc., or polyamino acids, such as $\epsilon$-poly lysine, $\gamma$-poly glutamic acid, poly-$\gamma$-methyl-L-glytamate, starches, cellulose, aliphatic polyesters, such as poly ethylene azipate, polycaprolactam, hydrophilic thermoplastic resins, such as chitin, chitosan, poly ethylene glycol, poly vinyl alcohol, etc. It is desirable that alkali decomposition products or elution composition of resin molding contain more polymer with the biodegradability as mentioned above or similar structures.

As described above, the resin molded portion of resin-molded electrical rotating device can be easily removed by chemical decomposition and disintegration based on it. The consistency with economy of the process for recycling metal components of electromagnetic members as valuable resources depends on the degree of void formation of resin moldings but it becomes possible to maintain and secure the reliability of resin-molded electrical rotating devices and to recover the metal components of discarded resin-molded electrical rotating devices as valuable resources.

Now, this invention is explained by way of more concrete embodiments (examples).
(Embodiment 1)

Resin-molding material was manufactured by adding 100 parts by weight of unsaturated polyester resin comprising 25% by weight diaryl phthalate of terephthalic acid based unsaturated polyester alkyd, 1 part by weight of dicumyl peroxide, 250 parts by weight of calcium carbonate with 15 $\mu$m or less particle size, 150 parts by weight of calcium carbonate with 50 to 500-$\mu$m particle size, 50 parts by weight of glass fibers, 12 parts by weight of zinc stearate, 0–10 parts by weight of p-toluensulfonylhydrazide with less than 15 $\mu$m particle size for forming voids and mixing them with a kneader. However, p-toluensulfonylhydrazide decomposes at 105°–110° C. and 110–120 mL/g nitrogen gas is discharged. The heat generation initiation temperature of unsaturated polyester resin by polymerization is 125° C. according to DSC.

Resin-molding material was manufactured with 100 parts by weight of unsaturated polyester resin with different concentration of diaryl phthalate of terephthalic acid based unsaturated polyester alkyd and 0 or 5 parts by weight of p-toluensulfonylhydrazide but other additives unchanged.

The above-mentioned resin-molding material was transferred to the cavity heated to 160° C. in advance at pressure of 80 kgf/cm$^2$ and speed of 10 mm/s and heated and cured for 5 minutes.

TABLE 1

| Class | Comparison 1 | Example 1 | Example 2 | Example 3 | Example 4 | Example 5 |
|---|---|---|---|---|---|---|
| Addition parts by weight | 0 | 1 | 3 | 5 | 7 | 10 |
| Density g/cm$^2$ | 2.15 | 2.03 | 1.67 | 1.43 | 1.36 | 1.15 |
| Molding shrinkage factor % | 0.21 | 0.20 | 0.23 | 0.20 | 0.19 | 0.22 |
| Tensile strength kgf/cm$^2$ | 321 | 301 | 253 | 215 | 194 | 151 |
| Insulation breakdown voltage kV/mm | 19.2 | 15.9 | 12.1 | 9.2 | 7.1 | 6.0 |

Table 1 shows the relationship between the addition rate of p-toluensulfonylhydrazide when the viscosity of unsaturated polyester resin $\eta_{20}$° C. 2.3×10$^5$ poises.

For a specific means for forming voids as shown in Table 1, dispersing in advance organic compounds which can form voids by discharging heat decomposition gas in the vicinity of polymerization initiation temperature of the unsaturated polyester resin or at temperature slightly lower than that allows heat decomposition gas to be taken into the resin and voids can effectively form voids. The mechanical strength lowers in accord with the degree of voids, but molding shrinkage or heat expansion remains unchanged. Since the degree of voids can be optionally controlled, the reliability can be sufficiently secured in the temperature range of actual application as plastic-molded rotating devices.

Figure 4:
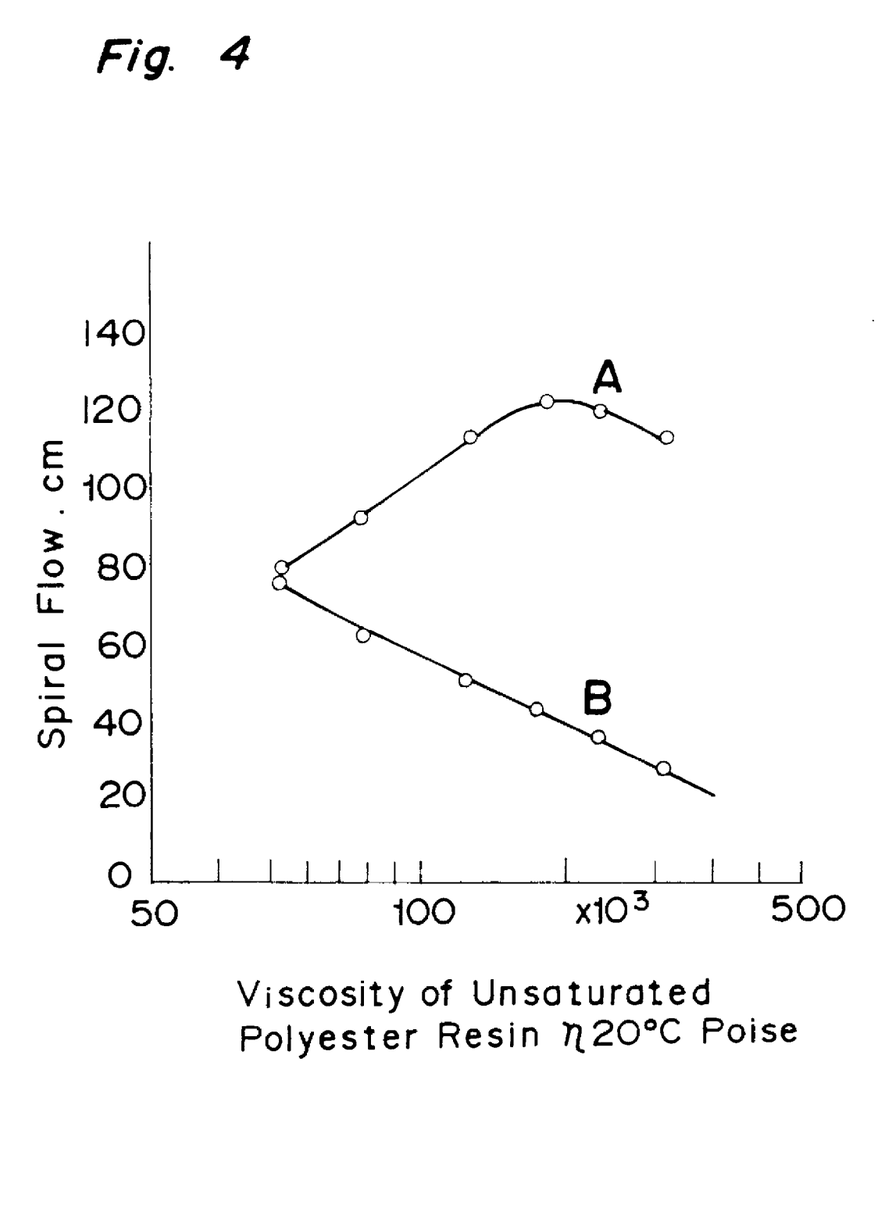
FIG. 4 shows a characteristic diagram showing the relationship between resin viscosity and spiral flows.

FIG. 4 is a characteristic diagram showing the relationship between $\eta_{20}$° C. of unsaturated polyester resin and spiral flow. However, in FIG. 4, A is the material with 5% by weight of p-toluensulfonyl hydrazide added and B the material with no additives added. Because the said expansion pressure is added to molding pressure when A takes in heat decomposition gas, the elongation of spiral flow is improved as compared to B. As is clear from FIG. 4, if the viscosity of unsaturated polyester resin $\eta_{20}$° C. is 70000 poises or higher, heat decomposition gas is taken into resin and voids are effectively formed.

Figure 5A:
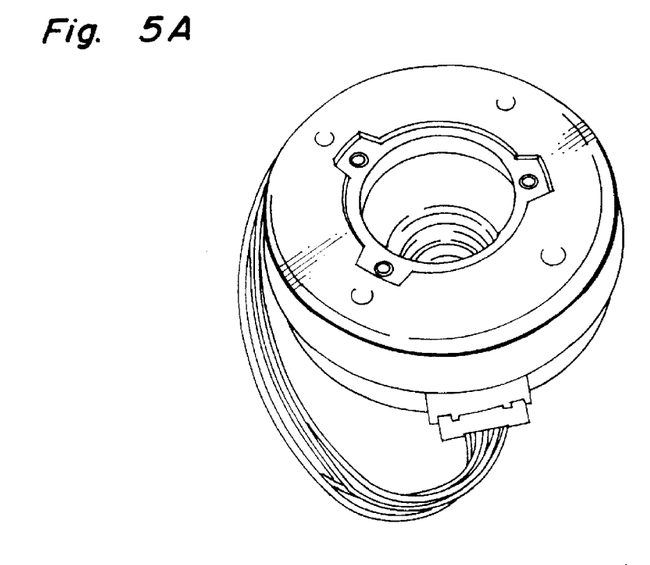
FIG. 5A is a perspective view of resin-molded stator.

Next, using the example 2 and comparison shown in Table 1, resin-molded stator of FIG. 5A was made. The resin-molded portion of this stator is 90 mm in outside diameter, 40 mm in inside diameter, and 40 mm high.

In addition, immersing the stator in the 40° C. 10% NaOH aqueous solution for 100 hours allows the decomposition liquid to penetrate the inside of the resin molding via voids and disintegration of resin molding occurs based on alkali decomposition and elution and removal of the decomposing component.

Figure 5B:
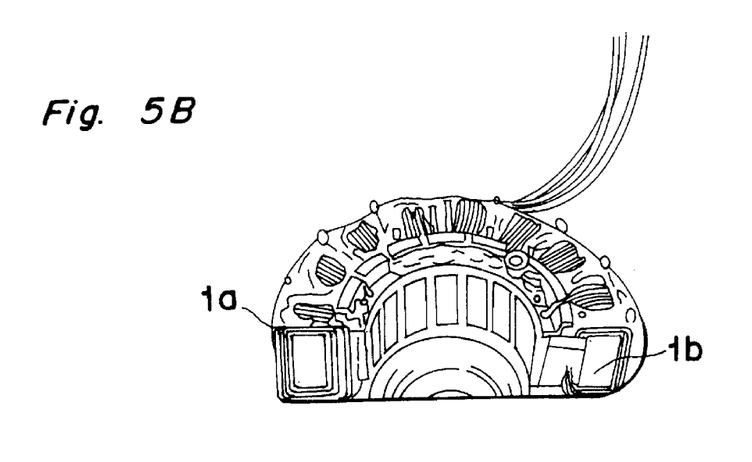
FIG. 5B is a perspective view showing disintegration of resin-molding.

As a result, in example 2, the electromagnetic winding 1$a$ and the electromagnetic steel sheet 1$b$ are exposed from the residues of resin molding disintegrated as shown in FIG. 5B. Further continuing the immersion one is able to completely release the electromagnetic wiring 1$a$ and electromagnetic steel sheet 1$b$ from the resin molding. Releasing the electromagnetic winding 1$a$ and the electromagnetic steel sheet 1$b$ from the resin molding enables open recycling of at least metal components of the electromagnetic members as valuable resources.

Figure 5C:
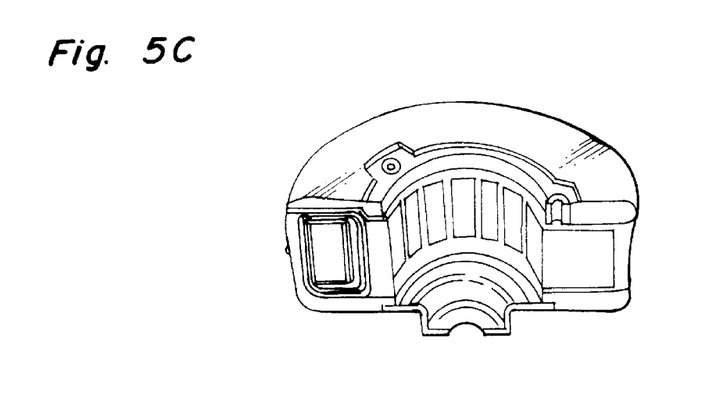
FIG. 5C is a perspective view of difficult-to-disintegrate resin-molding.

However, the absence of voids through which the decomposition solution penetrates as shown in FIG. 5C, causes alkali decomposition to take place only to 0.5 mm deep from the surface section of the resin molding, even if it is continuously immersed in the decomposition solution, and the electromagnetic winding 1$a$ and the electromagnetic steel sheet 1$b$ are unable to be completely released from resin molding.

(Embodiment 2)

Resin-molding material was manufactured by adding 14.8 parts by weight of unsaturated polyester resin comprising 40% by weight styrene solution of isophthalic acid based unsaturated polyester alkyd, 5.00 parts by weight of 70% by weight styrene solution of polycaprolactam, 0.20 parts by weight of t-butyl perbenzoate, 30 parts by weight of calcium carbonate with 15-$\mu$m or less particle size, 40 parts by weight of calcium carbonate with 50 to 500-$\mu$m particle sizes, 7.00 parts by weight of glass fibers, 1.00 part by weight of zinc stearate, 2.00 parts by weight of polyethylene powders and mixing them with a kneader.

Resin-molding material was manufactured by substituting polystyrene for polycaprolactam, aliphatic polyester and in addition polyvinyl butyral powder for polyethylene powders.

The above-mentioned resin-molding material was transferred and molded into products 3.25 mm thick, 12.8 mm wide, length 128 mm or products 2 mm thick and 80 mm in diameter. Then, the weight reduction ratio and bending strength holding factor when the product is immersed in the 40° C. decomposing agent comprising methanol, water, and NaOH (28:3.6:1) for 100 hours are shown in Table 2. However, the weight reduction ratio is indicated with the reduction ratio to the aliphatic component.

TABLE 2

|  |  | Weight reduction ratio % | Strength holding ratio % |
|---|---|---|---|
| Example 6 | Poly $\epsilon$ caprolactam/ styrene solution | 6.10 | 75.0 |
| Comparison 2 | Polystyrene/ styrene solution | 2.63 | 93.7 |
| Example 7 | Polyvinyl butyral powder | 9.12 | 48.0 |
| Comparison 3 | No thermoplastic resin | 0.12 | 98.0 |

As is clear from Table 2, for example, dissolving polystyrene of Comparison 2 in unsaturated polyester resin for polymerization and curing causes polystyrene to separate and condense during polymerization to form voids. The voids in this event possess an independent form in resin and between the resin and voids, a mixed phase of the said cured resin and thermoplastic resin exists. In order to promote decomposition of resin with the decomposing solution penetrating the voids, it is necessary to achieve the conditions shown in example 6 in which thermoplastic resin in the mixed phase should not interfere with the decomposition and voids are allowed to form even inside the plastic molding by using thermoplastic resin with excellent compatibility with unsaturated polyester.

In the case of independent voids as described above, it is more effective for disintegration of plastic molding by decomposition, elution, and removal to use polyvinyl butyral powder soluble to the decomposition solution as shown in Example 7 rather than dispersing polyethylene powder insoluble to the decomposing solution in the resin.

Consequently, it is necessary to use aliphatic saturated polyester as low shrinkage agent, which can be decomposed with the decomposing solution as in the case of example 6, or for the thermoplastic resin used itself to be alkali-decomposable and/or soluble to the decomposing solution like polyvinyl butyral powder insoluble to copolymerizable monomer as in the case of Example 7.

(Embodiment 3)

Resin-molding material was manufactured by mixing in a batch with a kneader 21.8 parts by weight of styrene solution comprising isophthalic acid of 40% by weight based unsaturated polyester alkyd, 8.90 parts by weight of 70% by weight styrene solution of poly $\epsilon$ caprolactam, 0.20 parts by weight of t-butyl perbenzoate, 60 parts by weight of calcium carbonate with 15-$\mu$m or less particle size, 6.60 parts by weight of glass fibers, 1.00 part by weight of zinc stearate, 2.00 parts by weight of polyethylene powders, 0.50% by weight of glycerin, and 3.00% by weight of micro capsule comprising acrylonitrile methylmethacrylate copolymer cells of 10 to 20-$\mu$m particle size containing isobutane.

The viscosity of unsaturated polyester resin is $\eta_{20}°$ C. 70000–110000 poises and the heat generation initiation temperature by polymerization initiation is 122° C. according to DSC. The heat absorption peak of DTA equivalent to cell softening temperature was 95° C.

The above-mentioned resin molding material is transferred to the cavity heated to 160° C. in advance at pressure 80 kgf/cm$^2$ and speed 10 mm/s, and heated and cured for 5 minutes. The resin molding material with density ranging from 1.61 to 1.67 g/cm$^3$ changed the density to 1.18 to 1.23 g/cm$^3$ by the expansion of cells at the time of molding. This is because cells of particle size 10–20 $\mu$m attain 40–100 $\mu$m or more by the cell expansion. Cells in the cured resin are nearly disintegrated but they can form uniform voids in low-viscosity polyester resin.

The molding shrinkage ratio of the above-mentioned material was 0.12%, volume resistivity of moldings 100 mm in outside diameter and 2 mm thick after being boiled for 1 hour was $2.1 \times 10^{12} \Omega$, indicating only a slight difference from that of before boiling of $2.3 \times 10^{12} \Omega$.

The resin molding material was transferred and molded to products 3.25 mm thick, 12.8 mm wide, and 128 mm long, or 2 mm thick and 80 mm in diameter. Then, the products were immersed for 100 hours in the 40° C. decomposition solution comprising methanol, water, and NaOH (28:3.6:1), and the weight reduction ratio and flexural strength holding ratio were measured, the results of which are shown in Table 3. However, the weight reduction ratio is shown by the reduction ratio to the resin component.

TABLE 3

|  | Weight reduction ratio % | Strength holding ratio % |
|---|---|---|
| Example 8 Microcapsule containing resin molding material | Unmeasurable | Disintegrated |

As is clear from Table 3, it is possible to completely disintegrate resin moldings by allowing uniform voids to be formed in low-viscosity unsaturated polyester resin by cell expansion.

According to the present invention as described above, various characteristics of resin-molded electrical rotating devices including small size, light weight, low noise, and high reliability can be maintained and secured in the in-service temperature range and the resources circulation recycle can be achieved to separate and recover metal components of electromagnetic members of discarded resin-molded electrical rotating devices as valuable sources.

Although the present invention has been described in terms of preferred embodiments, it will be apparent to those of skill in the art that numerous variations and modifications may be made without departing from the true spirit and scope thereof, as set forth in the following claims.

What is claimed is:

1. A method of recovering resources in a resin-molded electrical rotating device, said method comprising the steps of:

providing a resin molded electrical rotating device, wherein said device is made by integrally molding an electromagnetic member including a metal component with a resin molding into a solid body, wherein the resin molding contains voids, disintegrating the resin molding by chemically decomposing and/or eluting so as to remove the resin molding from the electromagnetic members; and separating and recovering at least the metal components in the electromagnetic members as the resources.

2. A method of recovering resources in a resin-molded electrical rotating device, said method comprising the steps of:

providing a resin molded electrical rotating device, wherein said device is made by integrally molding an electromagnetic member including a metal component with an unsaturated polyester resin molding into a solid body, wherein the resin molding contains voids, disintegrating the resin molding by alkali-decomposing and eluting so as to remove the resin molding from the electromagnetic members; and separating and recovering at least the metal components in the electromagnetic members as the resources.

3. The method of recovering resources in the resin-molded electrical rotating device according to claim 1, wherein said fine voids are continuous voids.

4. The method of recovering resources in the resin-molded electrical rotating device according to claim 2, wherein said fine voids are continuous voids.

5. A method of recovering resources in a resin-molded electrical rotating device, said method comprising the steps of:

providing a resin molded electrical rotating device, wherein said device is made by integrally molding an electromagnetic member including a metal component with a resin molding into a solid body, wherein the resin molding contains voids, and wherein the voids are formed in the resin molding by heat-decomposing the resin molding at a temperature in a vicinity of or slightly lower than a resin polymerization initiation temperature so as to discharge gas from the resin molding;

disintegrating the resin molding by chemically decomposing and/or eluting so as to remove the resin molding from the electromagnetic members; and separating and recovering at least the metal components in the electromagnetic members as the resources.

6. The method of recovering resources in the resin-molded electrical rotating device according to claim 5, wherein viscosity $\eta_{20}°$ C. of the resin at 20° C. is equal to or greater than 70000 poises.

* * * * *